United States Patent [19]

Guth et al.

[11] 4,023,938

[45] May 17, 1977

[54] PROCESS FOR DEHYDRATING GAS WITH SULFURIC ACID

[75] Inventors: Hans Guth, Bergisch-Neukirchen; Gerhard Jonas; Klaus Kleine-Weischede, both of Leverkusen; Hermann Wieschen, Cologne; Hans-Joachim Kaiser, Leverkusen; Karl-Heinz Dorr; Hugo Grimm, both of Frankfurt, all of Germany

[73] Assignees: Bayer Aktiengesellschaft, Leverkusen; Metallgesellschaft Aktiengesellschaft, Frankfurt, both of Germany

[22] Filed: Apr. 15, 1975

[21] Appl. No.: 568,341

Related U.S. Application Data

[63] Continuation-in-part of Ser. No. 514,874, Oct. 15, 1974, abandoned.

[30] Foreign Application Priority Data

Oct. 17, 1973  Germany ........................... 2352039
Mar. 8, 1975   Germany ........................... 2510241

[52] U.S. Cl. ........................................ 55/30; 55/73
[51] Int. Cl.² ........................................ B01D 53/14
[58] Field of Search .............. 55/29, 30, 31, 32, 73, 55/93

[56] References Cited

UNITED STATES PATENTS

| | | | |
|---|---|---|---|
| 3,593,497 | 7/1971 | Grimm | 55/250 |
| 3,780,499 | 12/1973 | Dorr et al. | 55/32 |
| 3,788,043 | 7/1974 | Dorr et al. | 55/73 X |
| 3,853,502 | 12/1974 | Dorr et al. | 55/73 X |

Primary Examiner—Frank A. Spear, Jr.
Assistant Examiner—E. Rollins Cross
Attorney, Agent, or Firm—Burgess, Dinklage & Sprung

[57] ABSTRACT

In the removal of water from a gas by contact with sulfuric acid, the improvement which comprises supplying the sulfuric acid in finely divided form having a surface of about $10^4$ to $10^7$ m²/h at a concentration of about 95 to 99% and a temperature of about 35° to 80° C and with a contact time of about 0.2 to 2 seconds, whereby the residual moisture content of the gas is reduced to about 30 to 250 mg of $H_2O/Nm^3$. Preferably the sulfuric acid is sprayed through a constriction into a vessel through which the gas is passed. The large sulfuric acid surface area permits high levels of dehydration to be achieved with far less sulfuric acid than heretofore believed possible and with small vessels and minimal contact times. Contact may be effected serially in several stages with the spent acids combined, brought up to initial concentration and recirculated.

13 Claims, 9 Drawing Figures

PROCESS FOR DEHYDRATING GAS WITH SULFURIC ACID

This is a continuation-in-part of Ser. No. 514,874, filed Oct. 15, 1974, now abandoned.

This invention relates to a process for drying $SO_2$—containing gases, in particular roasting or splitting gases as well as air used for the combustion of sulfur, the drying being carried out with sulfuric acid.

Apart from wet catalysis, in which high gas temperatures are employed to prevent the deposition of sulfuric acid concentrate in the catalyst itself and in the following systems, pipes and heat exchangers, it is known in the art to dry $SO_2$—containing gases as completely as possible after their wet purification by washing with concentrated sulfuric acid before they are used for catalystic oxidation. After the wet purification, the gases are saturated or super-saturated with steam and are subsequently dried with a counterflow of 95 – 98% sulfuric acid in towers of filling bodies. At inflow temperatures of up to 50° C, the acid is heated to 60°–75° C by the heat of dilution and condensation. In the drying installations commonly employed, the acid discharged from the drying tower is concentrated with fresh acid and cooled to the inflow temperature.

A similar process is adopted for drying air of combustion used for sulfur combustion, and for drying air of dilution, although the quantity of water which has to be condensed is considerably lower than in the case of roasting gases.

According to the figures published in the literature, the partial pressure of water vapor over 95% sulfuric acid at a temperature of 50° C is 0.0059 g/Nm$^3$. Trickling towers of the kind described above, however, are only able to dry down to 0.05, or at best 0.03 g of $H_2O/Nm^3$. Investigations carried out elsewhere (Peter, A. Chem. Techn. 22, 410 (1970)) have shown that this great difference from the equilibrium weight is due to the low wetting capacity in conventional drying towers of only 0.5, which means that only half the acid and filling bodies in the drying tower come into operation. This phenomenon is caused by the relatively low wettability at 50° C, which is due to the high viscosity of the acid as well as to the low trickling densities employed.

In spite of these facts, it is a firmly established principle, both in practice and in the literature, to operate drying towers with a maximum acid inlet temperature of 50° C. It is also repeatedly stated that drying to a residual mositure of 30, and at the most 50, mg $H_2O/mm^3$ is necessary to avoid the formation of $SO_3$—$H_2O$ mists in the absorption in sulfuric acid of contacted gases.

It has now been found that a much lower ratio of acid to gas can be used for drying $SO_2$ gases which contain water, or for drying air of combustion or dilution used for sulfuric acid production.

This invention therefore relates to a process for drying moisture containing gases, such as $SO_2$—containing gases as well as air of combustion and dilution for sulfuric acid production, using concentrated sulfuric acid, which is characterized in that the gases which are to be dried are brought into contact for about 0.2 to 2 seconds, preferably about 0.2 to 1.0 second, with finely divided sulfuric acid having a specific surface of about $10^4$ to $10^7$ m$^2$h, i.e., square meters per hour, preferably about $10^5$ to $10^6$ m$^2$/h, at a concentration of about 95 to 99%, preferably about 96 to 98% and more particularly about 96 to 97% and at a temperature of about 35° to 80° C, in particular about 50° to 75°˙C and more especially about 55° to 65° C, whereby the gases are thereby adjusted to a residual moisture content of about 30 to 250 mg, preferably about 50 to 200 mg and especially about 80 to 150 mg, of $H_2O/Nm^3$.

The phase interface necesary for material exchange is produced mechanically, for example by spraying. When acid is sprayed, the quantity required in circulation no longer depends on the trickling density but only on the desired concentration gradient between inflow and outflow. Thus, for example, for a quantity of air of 60 000 Nm$^3$/h and a moisture content of 15 g of $H_2O/Nm^3$ and a concentration ranging from 96.0 to 95.5% of $H_2SO_4$, 100 m$^3$ of acid per hour are required for drying the gas. If a concentraion gradient of 1% is selected, e.g. from 96.5% to 95.5% of $H_2SO_4$, then the quantity of acid is halved to 50 m$^3$/h. For a given quantity of acid, the degree of drying which can be achieved depends to a large extent on the mechanically produced phase interface, and can be economically effected without the dimensions of the apparatus operating as limiting factors.

It is not necessary to maintain any particular diameter of droplets. The only important factor for drying is the surface of the droplets. If the contact time is not more than 2 seconds, a water molecule absorbed on a drop of acid can only penetrate the drop to a depth of less than 100 A. If the drop has a diameter of more than 100 A, the concentration at the center of the drop is not altered during the drying process.

Experiments have shown that a maximum residual moisture content of 250 mg of $H_2O/Nm^3$ can be tolerated, particularly also with regard to avoiding the formation of $SO_3$—$H_2O$ mist.

Apparatus which are eminently suitable for the process according to the invention are, for example, the so-called venturi absorbers described in German Auslegeschrift No. 2,050,579, which are used for the absorption of $SO_3$. It is advantageous to arrange two or three such spray driers one behind another.

In accordance with another embodiment of the invention, absorbing liquid is injected into the outlet end of the vertical and/or horizontal Venturi tube absorber to flow countercurrently to the gases.

When it is desired to absorb $SO_3$ or moisture, concentrated sulfuric acid or oleum is injected as a liquid absorbent. When it is desired to concentrate dilute sulfuric acid, the latter is injected and dry gases, or gases having a low moisture content, are injected to absorb water from the dilute sulfuric acid. The dry gases consist preferably of end gases from contact process plants for producing sulfuric acid. Sulfuric acid mists and $SO_3$ may be removed from these gases as they are used to concentrate sulfuric acid. Alternatively, hot flue gases or air having a low moisture content may be used.

The additional liquid injected to flow countercurrently to the gases re-agitates and re-mixes the gas-liquid mixture which has formed as a result of the cocurrent injection. Besides, fresh liquid droplets are presented for a further reaction. The use of one or two countercurrent injection stations will depend on the desired degree of absorption or increase in concentration.

According to a preferred feature, liquid is injected into the inlet end of the horizontal Venturi tube to flow cocurrently with the gases. This results in a further increase of the degree of absorption or of the concentration.

According to a preferred feature, a major part of the residual liquid is separated from the gas-liquid mixture entering the horizontal Venturi tube by the action of internal fixtures and is conducted into the sump under the vertical Venturi tube. Internal fixtures acting as baffles in the inlet portion of the horizontal Venturi tube absorber effect a separation of a large part of the liquid absorbent which has not been collected in the sump under the vertical Venturi tube absorber and this part flows back into the sump under the vertical Venturi tube absorber. The internal fixtures in the inlet portion may consist of pockets, into which the liquid absorbent flows and which are connected by conduits to the sump. As a result, the liquid absorbents which circulate through the vertical Venturi tube absorber and through the settling chamber respectively, may be kept separately to a high degree and/or may greatly vary in concentration. Besides, the degree of absorption or increase in concentration effected by the subsequent treatment is improved.

According to a preferred feature, the gases are passed through a packed bed in the settling chamber before reaching the mechanical separating zone and the packed bed is supplied from above with liquid absorbent flowing countercurrently to the gases. This results in a very high degree of absorption and in a margin of safety in case of fluctuations in the compositions of the gas or of a failure of a nozzle. The packed bed has a height of 0.5–2 meters. Liquid absorbent may be sprinkld or injected onto the packed bed.

According to a preferred feature, about 5–50%, preferably 10–35%, of the total amount of liquid are injected into the Venturi tube or tubes to flow countercurrently to the gases. A high degree of absorption or a large increase in concentration is achieved with this proportion.

According to another preferred feature, about 10–75%, preferably 40–70%, of the total amount of liquid are injected into the venturi tube or tubes to flow cocurrently with the gases. A high degree of absorption or a large increase in concentration is achieved with this proportion too.

The invention will be further described with reference to the accompanying drawings wherein.

Figure 1:
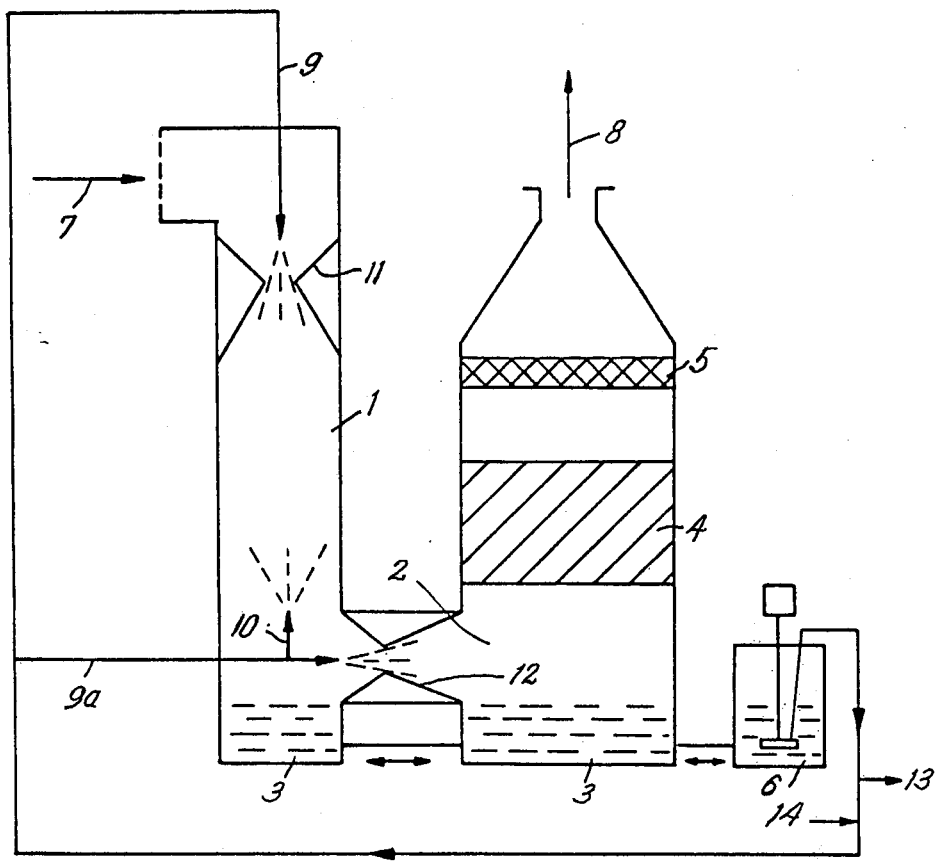
FIG. 1 is a schematic view of a first embodiment of an apparatus for carrying out the process.
Figure 2:
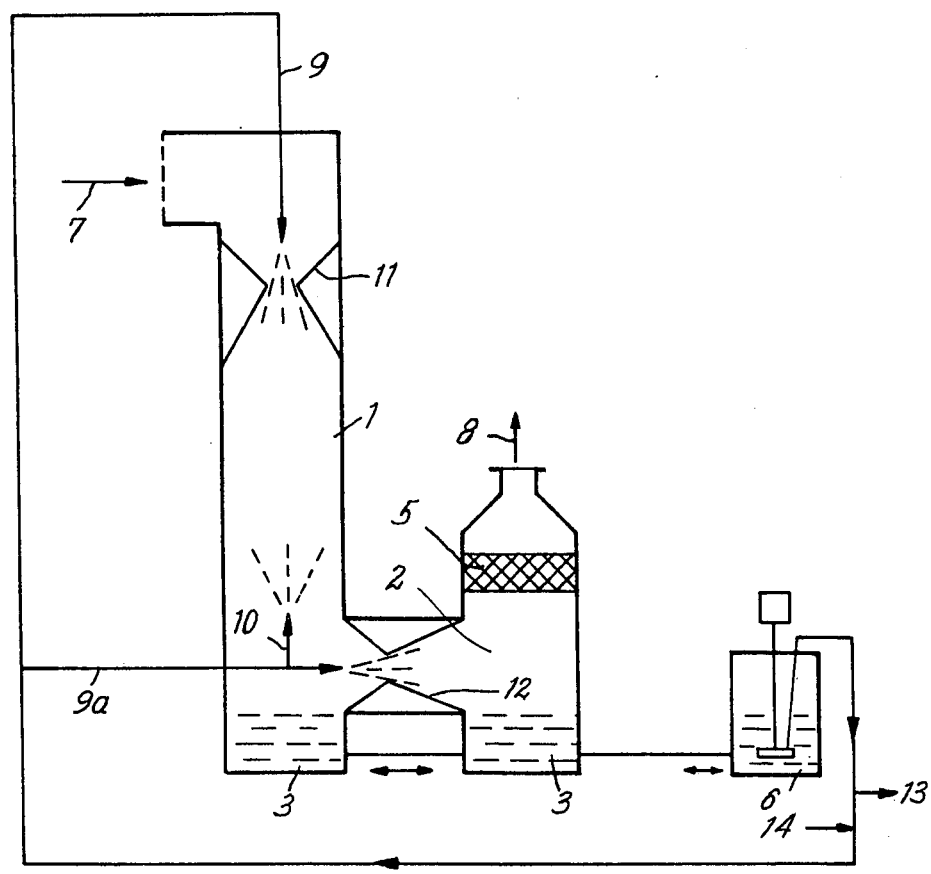
FIG. 2 is a schematic view of a second embodiment of an apparatus for carrying out the process.
Figure 3:
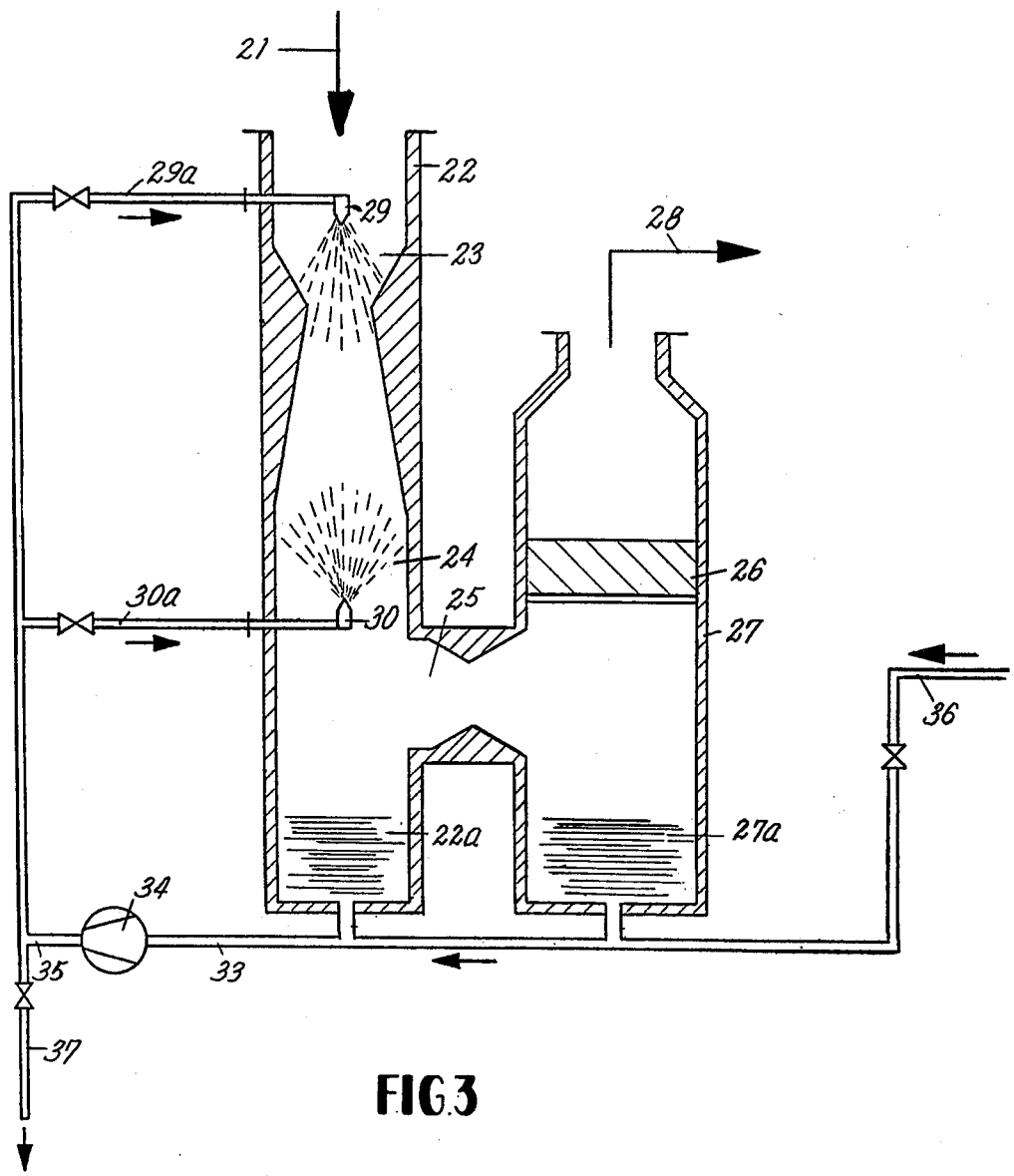
FIG. 3 is a schematic view of an apparatus for drying of air with concentrated sulfuric acid.
Figure 4:
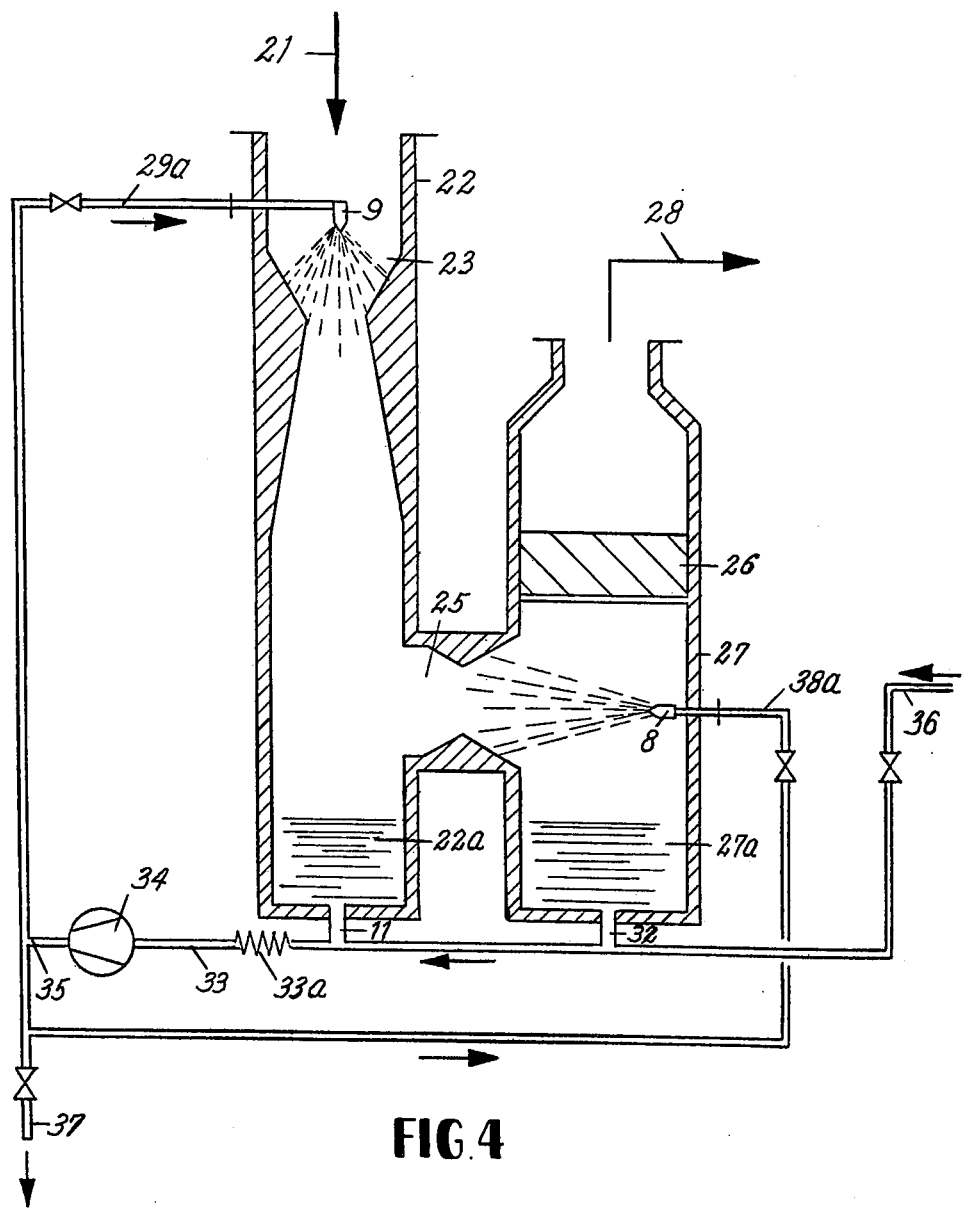
FIG. 4 is a schematic view of an apparatus for partial absorption of $SO_3$ in oleum.
Figure 5:
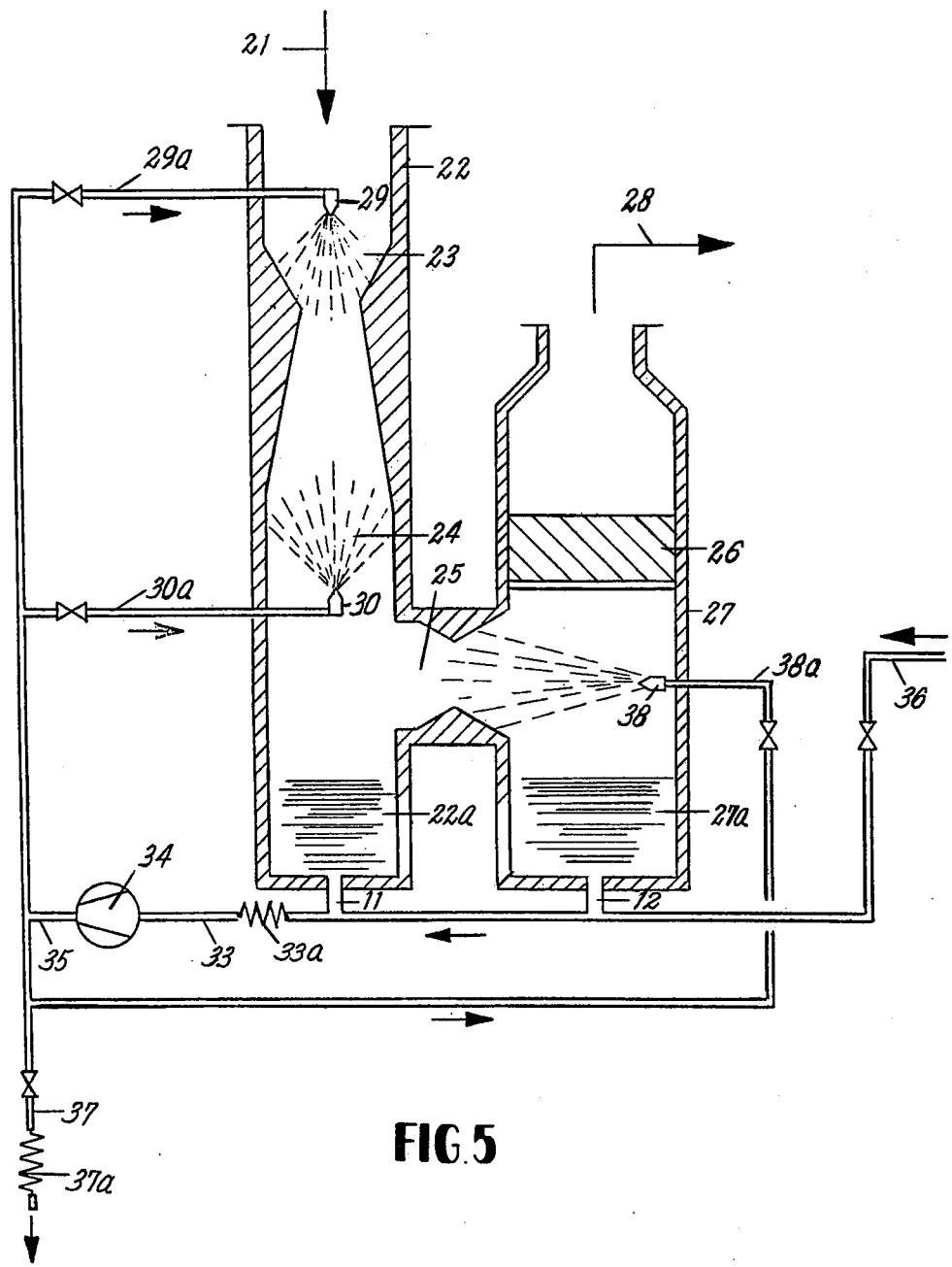
FIG. 5 is a schematic view of an apparatus for partial absorption of $SO_3$ in concentrated sulfuric acid.
Figure 6:
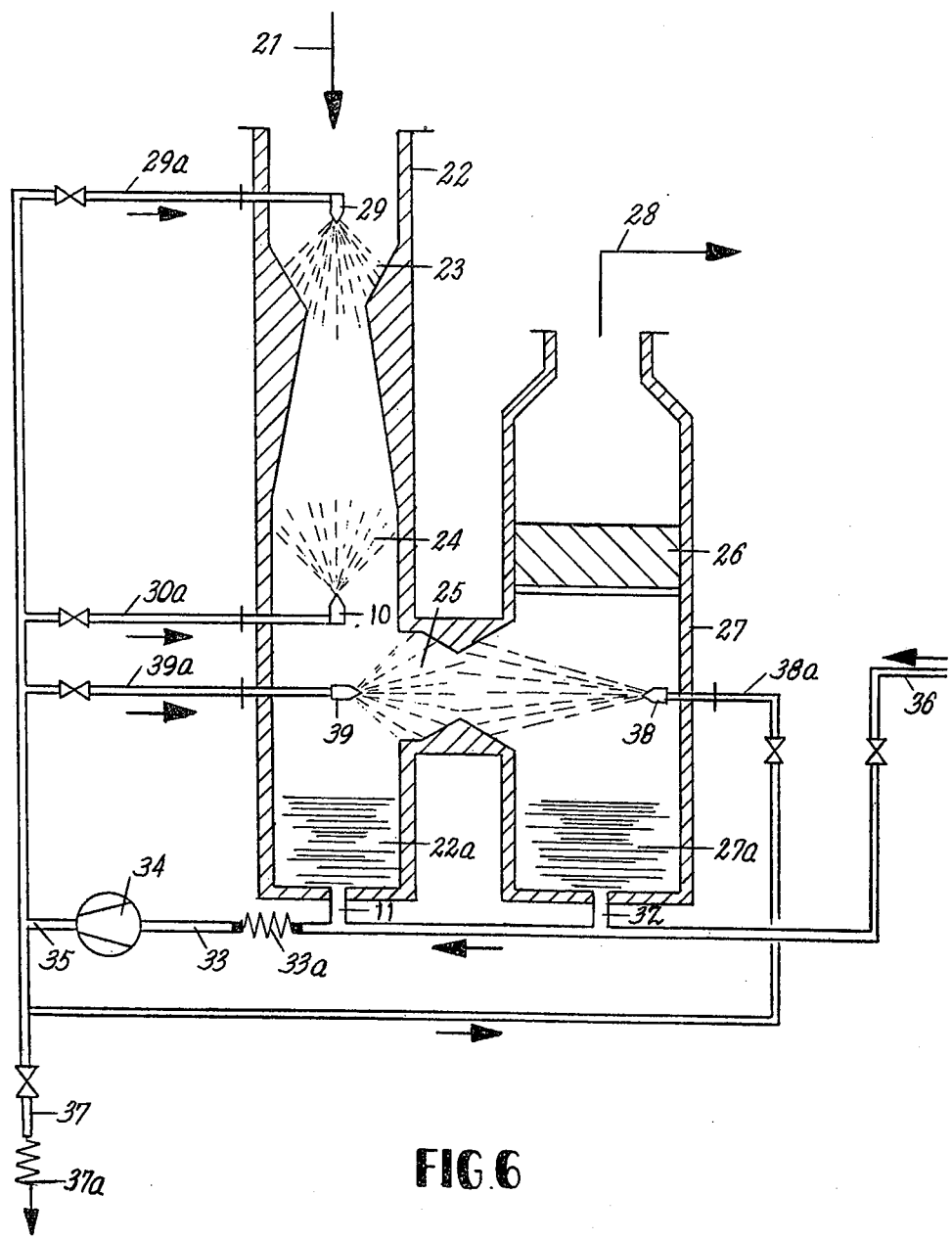
FIG. 6 is a schematic view of an apparatus for substantial absorption of $SO_3$ in concentrated sulfuric acid.
Figure 7:
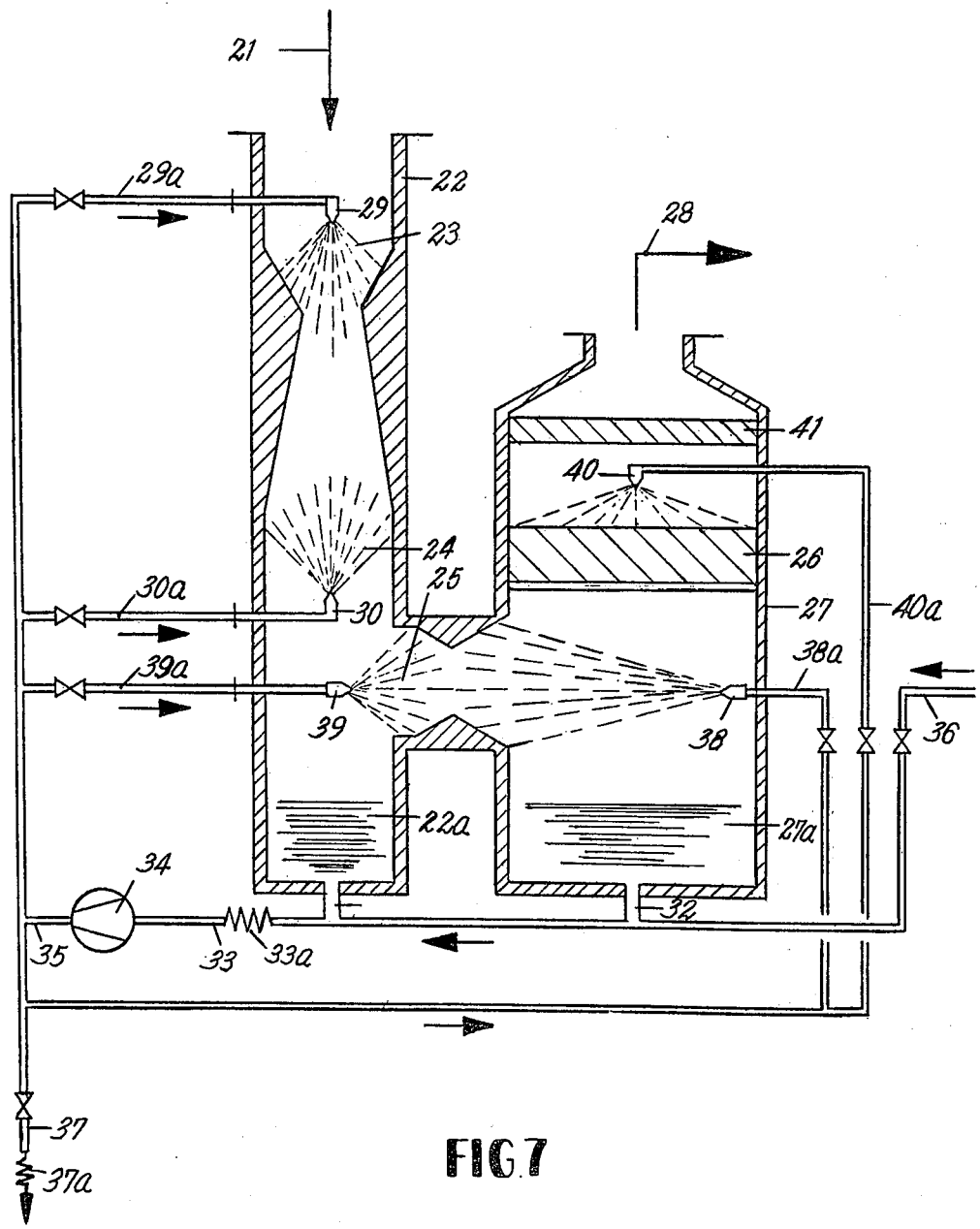
FIG. 7 is a schematic view of an apparatus for almost complete absorption of $SO_3$ in concentrated sulfuric acid.
Figure 8:
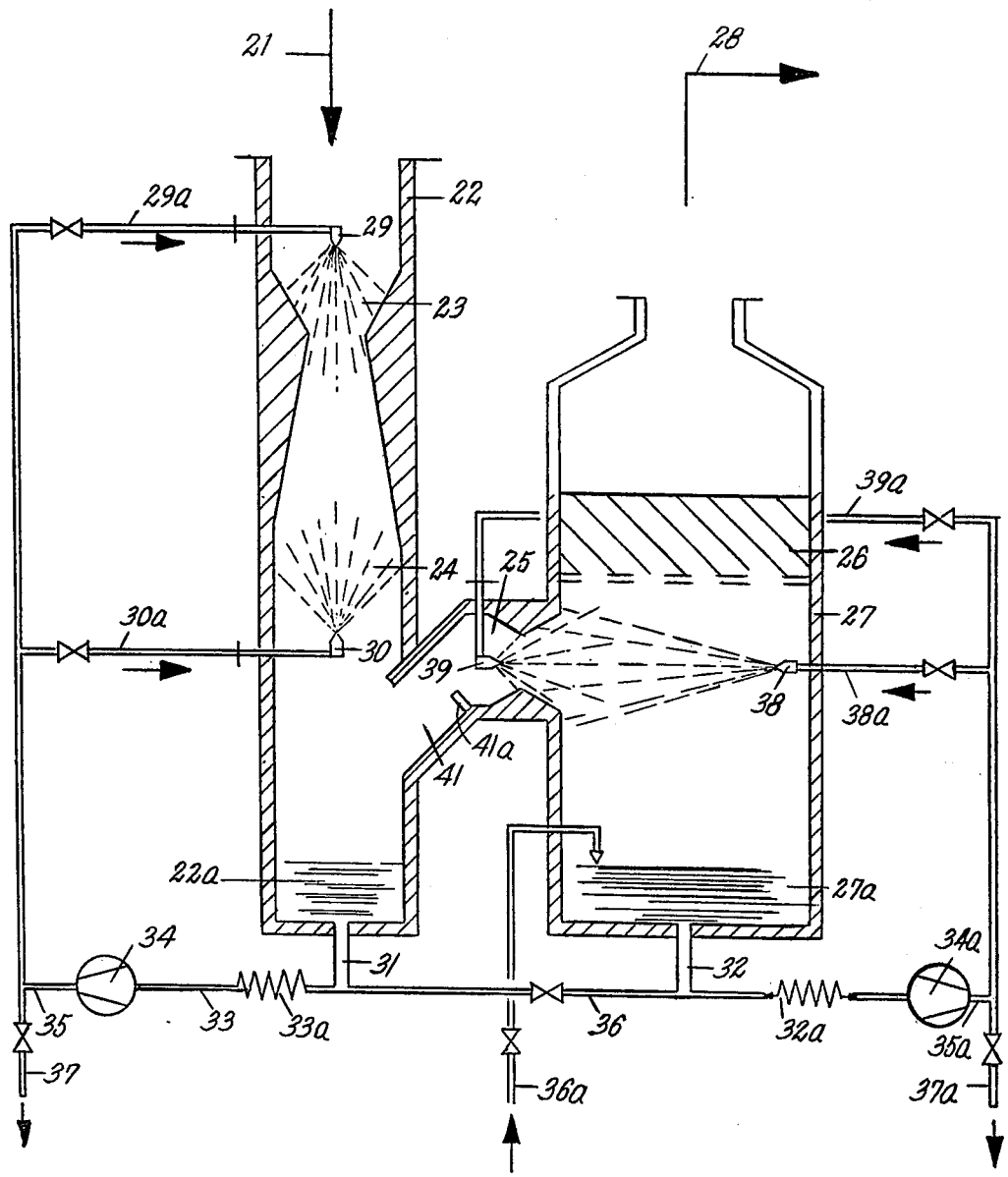
FIG. 8 is a schematic view of an apparatus for drying of $SO_2$—containing gases by a treatment with dilute sulfuric acid in the first stage and with concentrated sulfuric acid in the second stage.
Figure 9:
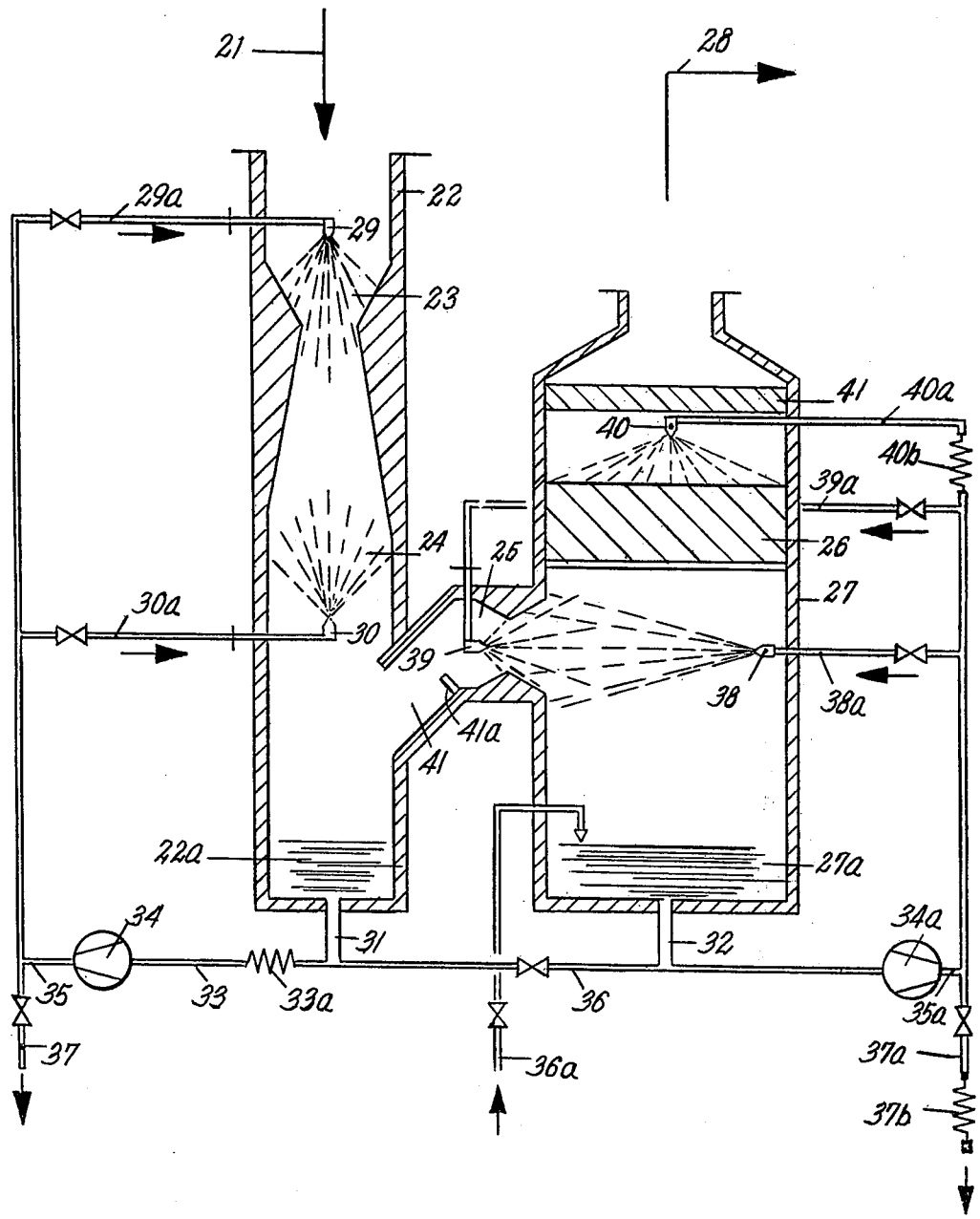
FIG. 9 is a schematic view of an apparatus for almost complete absorption of $SO_3$ with oleum in the first stage and with concentrated sulfuric acid in the second stage.

The numerals in FIGS. 1 and 2 have reference to the following structures:
1 = spray drier
2 = spray drier
3 = sulfuric acid sump
4 = acid stripper
5 = drop separator
6 = container for circulating acid
7 = gas inlet
8 = gas outlet
9, 9a = acid supply
10 = spray nozzle
11, 12 = venturi spray nozzle
13 = spent acid tap
14 = make-up acid inlet The numerals in FIGS. 3 to 9 have reference to the following structures:
21 = conduit
22 = absorber
22a = sump
23 = venturi tube
24 = chamber
25 = venturi tube
26 = drop separator
27 = tower
27a = sump
28 = conduit
29 = nozzle
29a = conduit
30 = countercurrent nozzle
30a, 31, 32, 33 = conduits
33a = cooler
34 = pump
35, 35a, 36, 36a, 37, 37a = conduits
37b = cooler
38 = countercurrent nozzle
38a = conduit
39 = nozzle
39a = conduit
40 = nozzle
40a = conduit
41 = drop separator Referring now more particularly to FIG. 1, the gas which is to be dried is introduced at 7 at a rate of from 5 to 39 m/sec, preferably from 10 to 15 m/sec, and at 1 and 2 it is brought into contact with sulfuric acid at a concentration of 95to 99% by weight, preferably 96–98% by weight, introduced through 9 and 9a. Desirably there is at least one nozzle 10 between the first and second venturi spray nozles 11 and 12 to introduce a third partial stream of acid in counterflow to the gas stream. This additional nozzle 10 is preferably combined with the acid supply 9a. The temperature of the acid, which is circulated through 6, is about 35° to 80° C, and is kept constant without cooling since the heat produced is removed by the dried gases. The temperature of the gas flowing out is equal to the acid temperature. The acid temperature is determined by the temperature and moisture content of the gas and is therefore subject to long term fluctuations (due to seasonal variations). Part of the dilute acid is removed from the container 6 at 13 and is replaced at 14 by fresh concentrated acid to restore the initial concentration. For a given concentration gradient between inflowing and outflowing acid, the ratio of gas to circulating acid depends on the water content of the gas. When the concentration of the acid is reduced, e.g. from about 97% to 96%, and the atmospheric moisture is about 5 to 30 g/Nm$^3$, the ratio of acid to gas is about 0.27 – 1.65 m$^3$ per 1,000 Nm$^3$. In the case of a roasting gas with a moisture content of about 20 – 50 g/Nm$^3$, the ratio is about 1.1 – 2.75 m$^3$ per 1,000 Nm$^3$ of roasting gas.

The reduction in concentration may be more than about 1% in the process according to the invention. Reductions of up to about 3% are acceptable. The ratios indicated above are then reduced accordingly, e.g. to one third if the difference is about 3%. Heretofore a tower of filling bodies operated with a gas velocity of about 1 Nm$^3$/sec and a trickling density of up to 15 m$^3$ of acid/m$^2$ h was usually employed for drying so that the ratio of circulating acid to gas was about 4.2 m$^3$/1,000 Nm$^3$ regardless of the degree of moisture of the gases which are being dried. The concentration gradient of the circulating acid is a function of the moisture of the gas.

At the constrictions in the spray washers, the sulfuric acid is supplied at such a rate to the moist gas that the acid becomes distributed in the gas with a large surface area (10$^4$ to 10$^6$ m$^2$/h). At the narrowest zones of the spray washers, the velocities of gas and acid are about 20 to 35 m/sec when the velocity ratio of constricted zone to widened zone is between about 1.5 : 1 and 3 : 1.

In the embodiment shown in FIG. 1, there is an acid stripper 4 in a layer of filling bodies before the drop separator 5. The acid stripper mainly effects an enlargement of the acid drops and partly an additional drying of the gas by retained acid. It is however not necessary to trickle the layer with acid. Further separation of droplets takes place in the separator 5. The separator used may be one of the usual filters of the kind known for sulfuric acid production. In the embodiment shown in FIG. 2 the droplets are only separated in the separator 5, stripper 4 having been omitted.

The residence times required in the known process and in the process according to the invention are a direct measure of the volume of apparatus required. Thus, for example, the residence time in a conventional drying tower is about 3.3 seconds but in a high-velocity spray drier according to the invention it is only about 0.6 seconds.

The functional efficiency is measured by the degree of drying, which is given by the expression:

$$\frac{\text{equilibrium moisture}}{\text{actual moisture of gas}}$$

For drying towers at 50° C it is about 0.118 – 0.196, and for spray driers at 65° C it is about 0.22.

The following comparison illustrates the results achieved:

| | |
|---|---|
| Equilibrium moisture over 95 % H$_2$SO$_4$ | at 50° C = 5.9 mg/Nm$^3$ |
| | at 65° C = 22 mg/Nm$^3$ |
| Actual moisture of gas in conventional towers in which the gas velocity is up to 1.2 m/sec: | at 50° C = 30 – 50 mg/Nm$^3$; |
| in spray driers in which the gas velocity is up to | 30 m/sec: |
| | at 65° C = 100 mg/Nm$^3$. |

The proposed drying process is particularly advantageous for sulfur combustion plants, either without or with slight cooling of the acid. In these plants, the high energy content of the air of combustion can be removed particularly advantageously after combustion in the form of steam. When this high-velocity spray drier is used, the investment costs are lower since the apparatus is much smaller than conventional trickling towers, and a further saving is obtained from the fact that the acid need not be cooled. Accordingly, no cooler is required in the first place and there is a continuous saving in cooling energy. When the concentration gradient spread between inflowing and outflowing drying acid is 1%, the quantity of acid which needs to be pumped through the circuit may be up to 70% less than in conventional towers.

The process according to FIGS. 1 and 2 will now be described in more detail with the aid of the following Examples.

EXAMPLE 1a 50,000 Nm$^3$ of air per hour, having a moisture content of 4.0 g of H$_2$O/Nm$^3$, were dried in a plant as shown in FIG. 1, but without using the counterflow nozzle 10 between the first and second venturi spray nozzles, 11 and 12. The gas inlet temperature was 3.4° C. The acid concentration was 96.4% H$_2$SO$_4$ and its temperature was 34° C. The dried air had a residual moisture content of 66 mg of H$_2$O/Nm$^3$ and a temperature of about 34° C. The acid was circulated at the rate of 120 – 180 m$^3$/h. Under the given operating conditions, the sprayed H$_2$SO$_4$ had a surface of 1.53 . 10$^5$ m$^2$/h.

EXAMPLE 1b

The same quantity of gas, but with a moisture content of 7.0 g of H$_2$O/Nm$^3$, was dried in a plant as in Example 1a. The acid concentration was 96.3% H$_2$SO$_4$ and the temperature of the acid was 41° C. The residual moisture content was in this case 102 mg of H$_2$O/Nm$^3$. The rate of circulation of acid was 120 – 180 m$^3$/h. Under the given operating conditions, the sprayed H$_2$SO$_4$ had a surface of 1.07 . 10$^5$ m$^2$/h.

EXAMPLE 2a 60,000 Nm$^3$/h of gas having a moisture content of 5.6 g of H$_2$/Nm$^3$ were dried in a plant shown in FIG. 1. The gas inlet temperature was 7° C, the acid temperature was 33° C and the acid concentration was 96.3 –96% H$_2$SO$_4$. The dried air had a residual moisture content of 43 mg of H$_2$O/Nm$^3$. Under the given operating conditions, the sprayed H$_2$SO$_4$ had a surface of 3.3 . 10$^5$ m$^2$/h. The acid circulation was approximately 51 m$^3$/h.

EXAMPLE 2b 60,000 Nm$^3$ of air per hour, having a moisture content of 14.9 g of H$_2$O/Nm$^3$, were dried in a plant as described in Example 2a. The acid temperature was 61° C, the acid concentration was 96.5 – 96% H$_2$SO$_4$ and the residual moisture content of the dried air was found to be 81 mg of H$_2$O/Nm$^3$. Under the given operating conditions the sprayed H$_2$SO$_4$ had a surfuce of 3.6 . 10$^5$ m$^2$/h. The acid circulation was approximately 50 m$^3$/h.

EXAMPLE 3

60,000 Nm$^3$ of air per hour, having a moisture content of 19 g of H$_2$O/Nm$^3$, were dried in a plant as shown in FIG. 2. The gas inlet temperature was 22° C. The amount of water brought in was 1.140 kg H$_2$O/h. The concentration of acid entering at 9, 9a and 10 was 96.5% $H_2SO_4$ and the concentration of acid leaving at 3 was 96%. The acid was circulated at the rate of 118 m³/h. The temperature of acid inlet and outlet as well as the gas outlet was 77° C. Under the given operating conditions, the sprayed $H_2SO_4$ had a surface of 4.59 . $10^5$ m²/h. The residual moisture content was 95 mg of $H_2O$/Nm³.

EXAMPLE 4

Under the same conditions as in Example 3 the same gas was dried, but with a surface of the sprayed $H_2SO_4$ of 9 . $10^5$ m²/h. The residual moisture content was 65 mg of $H_2O$/Nm³.

The process and apparatus according to FIGS. 3 to 9 will be described in more detail in the following examples.

EXAMPLE 5 (FIG. 3)

Atmospheric air which is at a temperature of 10° C and contains about 8,000 mg $H_2O$/standard m³, corresponding to a water vapor saturation of 80%, is fed into a Venturi tube absorber 22 through circuit 21 at a rate of 10,000 standard m³/h. In a venturi tube 23, the air is contacted with 96% by weight sulfuric acid, which is fed through conduit 29a at a rate of 15 m³/h and is injected through nozzle 29. 96% by weight sulfuric acid is fed through conduit 30a at a temperature of 80° C and at a rate of 5 m³/h and is injected through a countercurrent nozzle 30 in chamber 4 to flow in a countercurrent. The predried air-acid mixture is agitated in a second venturi tube 25 and flows through a tower 27, a drop separator 26 and a conduit 28. The degree of drying is about 98.5% so that the air is dried to about 120 mg $H_2O$/ standard m³. The acid collects in sumps 22a and 27a and flows through conduits 31, 32, and 33 to a pump 34 and is forced through conduit 35 and conduits 29a and 30a back to the nozzles 29 and 30. Make-up acid having a concentration of 98.5% by weight is fed from the absorber cycle through conduit 36 at a rate of about 2 m³/h and serves to maintain the concentration of the acid in the dryer cycle. Acid from the dryer is returned through conduit 37 to the absorber cycle at a rate of about 2 m³/h.

EXAMPLE 6 (FIG. 4)

$SO_3$—containing gas which contains about 290,000 mg $SO_3$/standard m³, corresponding to an $SO_3$ content of 8.0% by volume, is fed through conduit 21 into a venturi tube absorber 22 at a temperature of 150° C and at a rate of 10,000 standard m³/h. In a venturi tube 23, the gas is contacted with oleum, which contains 25% free $SO_3$ and which is fed in conduit 29a at a temperature of 50° C and at a rate of 38 m³/h and is injected through nozzle 29. The gas is cooled and prescrubbed in the venturi tube 23 and in a second venturi tube 25. Oleum which contains 25% free $SO_3$ is fed through conduit 38a at a temperature of 50° C and at a rate of 35 m³/h and is injected through countercurrent nozzle 38. The scrubbed gas flows through the drop separator 26 and then leaves the tower 27 in conduit 28. The degree of absorption is about 80% so that the gas still contains about 58,000 mg $SO_3$/standard m³, corresponding to an $SO_3$ content of about 1.6% by volume. The acid collects in the sumps 22a and 27a and flows through conduits 31 and 32, an acid cooler 33a and a conduit 33 to a pump 34 and is forced through conduit 35 and conduits 29a and 38a back to the nozzles 29 and 38. 98.5% by weight sulfuric acid is fed from the monohydrate absorber cycle in conduit 36 to the oleum absorber cycle at a rate of 3.2 m³/h. The product is discharged through conduit 37.

EXAMPLE 7 (FIG. 5)

$SO_3$—containing gas which contains about 350,000 mg $SO_3$/standard m³, corresponding to an $SO_3$ content of 9.8% by volume is fed through conduit 21 into a venturi tube absorber 22 at a temperature of 220° C and at a rate of 10,000 standard m³/h. In a venturi tube 23, the gas is contacted with 98.3% by weight sulfuric acid, which is fed through conduit 29a at a temperature of 80° C and at a rate of 55 m³/h and is injected through nozzle 29. 98.3% by weight sulfuric acid is fed through conduit 30a at a temperature of 80° C and at a rate of 15 m³/h and is injected through a countercurrent nozzle 30 in chamber 24 to flow in a countercurrent. 98% of the $SO_3$ are absorbed in the venturi tube 23 and the chamber 24. The gas is then fed into a second venturi tube 25. 98.3% by weight sulfuric acid is fed through conduit 38a at a temperature of 80° C and at a rate of 25 m³/h and is injected through countercurrent nozzle 38. The scrubbed gas flows through a drop separator 26 and then leaves tower 27 through conduit 28. The total degree of absorption is 99% so that the gas still contains 3,500 $SO_3$/standard m³. The acid collects in sumps 22a and 27a and flows through conduits 31 and 32, an acid cooler 33a and a conduit 33 to a pump 34 and is forced through conduit 35 and conduits 29a, 30a, and 38a back to nozzles 29, 30 and 38. 96% by weight sulfuric acid is fed from the dryer cycle through conduit 36 into the absorber cycle. The product is delivered through conduit 37 and is cooled in cooler 37a to about 45° C.

EXAMPLE 8 (FIG. 6)

$SO_3$—containing gas which contains about 350,000 mg $SO_3$/standard m³, corresponding to an $SO_3$ content of 9.8% by volume, is fed through conduit 21 into a venturi tube absorber 22 at a temperature of 220° C and at a rate of 10,000 standard m³/h. In a venturi tube 23, the gas is contacted with 98.3% by weight sulfuric acid, which is fed through conduit 29a at a temperature of 80° C and at a rate of 55 m³/h and is injected through nozzle 29. 98.3% by weight sulfuric acid is fed through conduit 30a at a temperature of 80° C and at a rate of 10 m³/h and is injected through countercurrent nozzle 30 in chamber 24 to flow in a countercurrent. 98% of the $SO_3$ are absorbed in the venturi tube 23 and the chamber 24. The gas is then fed into a second venturi tube 25. 98.3% by weight sulfuric acid is fed through conduit 39a at a temperature of 80° C and at a rate of 25 m³/h and is injected into the venturi tube 25 through nozzle 39. 98.3% by weight sulfuric acid is fed through conduit 38a at a temperature of 80° C and at a rate of 10 m³/h and is injected through a countercurrent nozzle 38. The scrubbed gas flows through a drop separator 26 and then leaves tower 27 through conduit 28. The total degree of absorption is 99.8% so that the gas still contains 700 mg $SO_3$/ standard m³. The acid collects in sumps 22a and 27a and flows through conduits 31 and 32, an acid cooler 33a and conduit 33 to pump 34 and is forced through conduit 35 and conduits 29a, 30a, 38a, and 39a back to nozzles 29, 30, 38, and 39. 96% by weight sulfuric acid is fed from the dryer cycle through conduit 36 into the absorber cycle at a rate of 26 m³/h. The product is discharged through conduit 37 and is cooled in a cooler 37a to about 45° C.

EXAMPLE 9 (FIG. 7)

SO$_3$—containing gas which contains 35,600 mg/standard $m^3$, corresponding to an SO$_3$ content of 1.0% by volume, is fed into a venturi tube absorber 22 through conduit 21 at a temperature of 220° C and at a rate of 10,000 standard $m^3$. In a venturi tube 23, the gas is contacted with 98.8% by weight sulfuric acid, which is fed through conduit 29a at a temperature of 60° C and at a rate of 40 m$^3$/h and is injected through nozzle 29. 98.8% by weight sulfuric acid is fed in conduit 30a at a temperature of 60° C and at a rate of 10 m$^3$/h and is injected through countercurrent nozzle 30 in chamber 4 to flow in a countercurrent. 98.0% of the SO$_3$ are absorbed in the venturi tube 23 and the chamber 24. The gas is then fed into a second venturi tube 25. 98.8% by weight sulfuric acid is fed through conduit 39a at a temperature of 60° C and at a rate of 20 m$^3$/h and is injected into the venturi tube 25 through nozzle 39. 98.8% by weight sulfuric acid is fed through conduit 38a at a temperature of 60° C and at a rate of 10 m$^3$/h and is injected through countercurrent nozzle 38. A final absorption is effected in a packed bed 26, which is contained in a tower 27 and supplied with 98.8% by weight sulfuric acid, which is fed through conduit 40a at a rate of 15 m$^3$/h and is injected through nozzle 40. (The nozzle may be replaced by one of the conventional sprinkler systems, such as sprinkler pipes). The scrubbed gas flows through a drop separator 41 and then flows from tower 27 through conduit 28 into an exhaust gas chimney. The total degree of absorption is 99.99% so that the residual content of SO$_3$ content of the gas is only 36 mg/standard m$^3$. The acid collects in sumps 22a and 27a and flows through conduits 31 and 32, an acid cooler 33a, and a conduit 33 to a pump 34 and is forced through conduit 35 and conduits 29a, 30a, 38a, 39a, and 40a back to the nozzles 29, 30, 38, 39, and 40. 96–97% by weight sulfuric acid is fed from the dryer cycle through conduit 36 to the absorber cycle at a rate of about 2 m$^3$/h. The product is withdrawn through conduit 37 and is cooled in cooler 37a to about 45° C.

EXAMPLE 10 (FIG. 8)

SO$_2$—containing gas which is at a temperature of 40° C and contains 63,100 mg H$_2$O/standard m$^3$, corresponding to a water vapor saturation of 100%, is fed through conduit 21 into a venturi tube absorber 22 at a rate of 10,000 standard m$^3$/h. In a venturi tube 23, the gas is contacted with 78% by weight sulfuric acid, which is fed through conduit 29a at a temperature of 50° C and at a rate of 45 m$^3$/h and is injected through nozzle 29. 78% by weight sulfuric acid is fed through conduit 30a at a temperature of 50° C and at a rate of 15 m$^3$/h and is injected through countercurrent nozzle 30 in chamber 24 to flow in a countercourrent. 92% of the H$_2$O are removed in the venturi tube 23 and the chamber 24 so that the gas which leaves the venturi tube absorber 22 after the first drying stage still contains about 5,000 mg H$_2$O/standard m$^3$. The predrying acid collects in a sump 22a and is withdrawn through conduit 31. The required make-up acid having a concentration of about 96% by weight sulfuric is admixed through conduit 36. The acid is subsequently cooled in cooler 33a and flows through conduit 33 to pump 34 and is forced through conduits 35, 29a, and 30a back to the nozzles 29. Product having a concentration of 78% by weight sulfuric acid is discharged through conduit 37. The predried gas flows into a second venturi tube 25 through an inclined inlet portion 41, which incorporates a semicircular baffle wall 41a. 96% by weight sulfuric acid is fed through conduit 39a at a temperature of 50° C and at a rate of 25 m$^3$/h and is injected into the venturi tube 25 through nozzle 39. 96% by weight sulfuric acid is fed through conduit 38a at a temperature of 50° C and at a rate of 5 m$^3$/h and is injected through a countercurrent nozzle 38. The dried gas flows through a drop separator 26 and then leaves the second drying stage through a conduit 28 leading from tower 27. The degree of drying is 99.95% based on the feed gas so that the dry gas contains 35 mg H$_2$O/standard m$^3$. The afterdrying acid collects in the sump 27a and flows through conduit 32 and an acid cooler 32a to a pump 34a and is forced through conduits 35a, 38a, and 39a back to the nozzles 38 and 39. The make-up acid having a concentration of 98.5% by weight sulfuric acid is fed from the SO$_3$ absorber circuit through conduit 36a. Surplus drying acid having a concentration of about 96% by weight sulfuric acid is returned through conduit 37a into the SO$_3$ absorber circuit.

EXAMPLE 11 (FIG. 9)

SO$_3$-containing gas which contains about 290,000 mg SO$_3$/standard m$^3$, corresponding to 8.0% by volume SO$_3$, is fed through conduit 21 into a venturi tube absorber 22 at a temperature of 150° and at a rate of 10,000 standard m$^3$/h. In a venturi tube 23, the gas is contacted with oleum which contains 25% free SO$_3$ and which is fed through conduit 29a at a temperature of 40° C and at a rate of 38 m$^3$/h and is injected through nozzle 29. Oleum which contains 25% free SO$_3$ is fed through conduit 30a at a temperature of 40° C and a rate of 35 m$^3$/h and is injected through countercurrent nozzle 30 in chamber 24 to flow in a countercurrent. About 80% of the SO$_3$ are absorbed in the venturi tube 23 and the chamber 24 so that the gas which leaves the venturi tube absorber 22 after the first absorption stage still contains about 58,000 mg SO$_3$/standard m$^3$. The oleum collects in sump 22a and is withdrawn through conduit 31. 98.7% by weight sulfuric acid from the acid cycle of the second absorption stage are admixed through conduit 36 at a rate of about 3.0 m$^3$/h. The acid is then cooled in a cooler 33a, flows through conduit 33 to a pump 34 and is forced through conduits 35, 29a, and 30a back to the nozzles 29 and 30. The oleum product containing 25% free SO$_3$ is discharged through conduit 37. The prescrubbed gas flows into a second venturi tube 25 through an inclined inlet portion 41, which incorporates a semicircular baffle wall 41a. 98.7% by weight sulfuric acid is fed through conduit 39a at a temperature of about 100° C and at a rate of about 30 m$^3$/h and is injected into the venturi tube 25 through nozzle 39. 98.7% by weight sulfuric acid is fed through conduit 38a at a temperature of 100° C and at a rate of 10 m$^3$/h and is injected through a countercurrent nozzle 38. The final absorption is effected in a packed bed 26, which is disposed in a tower 27 and which is supplied with 98.7% by weight sulfuric acid flowing through conduit 40a at a temperature of 80° C and at a rate of 15 m$^3$/h and injected through nozzle 40. (The nozzle may be replaced by one of the conventional sprinkler systems, such as sprinkler pipes.) The acid is previously cooled in a cooler 40b.

The scrubbed gas leaves the second absorption stage through drop separator 41 and conduit 28. The total degree of absorption is 99.97%, based on the feed gas, so that the gas finally contains about 90 mg $SO_3$/standard $m^3$. The acid collects in sump 27a and flows through conduit 32 to pump 34a and is forced through conduits 35a, 38a, 39a, and 40a back to the nozzles 38, 39, and 40. 96% by weight sulfuric acid is fed from the dryer cycle through conduit 36a into the $SO_3$ absorber cycle. 98.7% by weight sulfuric acid is withdrawn through conduit 37a and is cooled in cooler 37b to about 45° C.

The basic principle used to increase the degree of absorption of $SO_3$ or moisture illustrated in the Examples is also applicable to the absorption of other gaseous constitutents or to increase the concentration.

$SO_3$ may alternatively be absorbed in hot sulfuric acid at about 100°–160° C so that the gas leaves at a correspondingly higher temperature and less heat is transferred to the sulfuric acid.

The advantages afforded by the invention over the known processes reside mainly in that a higher degree of abosrption or a larger increase in concentration can be achieved in equipment having a given size, or a given efficiency can be achieved in smaller equipment. This permits of a reduction of the operating costs and capital investment. The process can be used with high efficiency to increase the concentration of contaminated, dilute sulfuric acids without a risk of trouble due to clogging.

It will be appreciated that the instant specification and examples are set forth by way of illustration and not limitation, and that various modifications and changes may be made without departing from the spirit and scope of the present invention.

What is claimed is:

1. In the removal of water from a gas containing about 5 to 30 g of water per $Nm^3$ by contact with sulfuric acid, the improvement which comprises supplying the sulfuric acid in finely divided form having a surface of about $10^4$ to $10^7$ $m^2/h$ at a concentration of about 95 to 99% and a temperature of about 35° to 80° C and with a contact time of about 0.2 to 2 seconds, whereby the residual moisture content of the gas is reduced to about 30 to 250 mg of $H_2O/Nm^3$.

2. The process of claim 1, wherein the sulfuric acid has a concentration of about 96 to 98% and a temperature of about 50° to 75° C, and the velocity of the gas during contact is about 5 to 30 m/sec.

3. The process of claim 1, wherein the sulfuric acid has a surface of about $10^5$ to $10^6$ $m^2/h$, a concentration of about 96 to 97% and a temperature of about 55° to 65° C, the velocity of gas during contact is about 10 to 15 m/sec, and the residual moisture content of the gas is reduced to below about 150 mg of $H_2O/Nm^3$.

4. The process of claim 3, wherein the heat of absorption is removed by the drying gases.

5. The process of claim 3, wherein a portion of the spent sulfuric acid is removed and replaced by more concentrated sulfuric acid to restore the initial concentration, and such restored acid is recirculated for contact with further gas.

6. The process of claim 5, wherein the air to be treated is caused to pass through at least one constriction and the sulfuric acid with which it is to be contracted is sprayed through said constriction, thereby promoting the enlargement of the surface area of the sulfuric acid.

7. The process of claim 6, wherein the air is caused to pass successively through a vertical constriction and a horizontal constriction and sulfuric acid is sprayed through said constrictions, the sulfuric acid sprayed through at least one of said constrictions being injected into the outlet end of the constriction to flow countercurrently to the air.

8. In a process of absorbing gaseous constituents from gases in liquid absorbents, particularly of absorbing $SO_3$ or moisture in sulfuric acid or of absorbing water from dilute sulfuric acid in hot gases, which comprises injecting liquid absorbent into the upper portion of a vertical venturi tube absorber to flow cocurrently with the gases, collecting a large part of the injected liquid absorbent in a sump below the outlet end of the vertical venturi tube absorber, feeding the gases together with the residual liquid absorbent below the outlet end of the vertical venturi tube absorber and above the sump into a substantially horizontal venturi tube absorber, feeding the mixture of gases and liquid absorbent from the horizontal venturi tube absorber into a settling chamber which contains a mechanical separating zone for a removal of fine droplets in the upper portion of the settling chamber before the gas outlet, and collecting the liquid absorbent in a sump at the bottom of the settling chamber, the improvement which comprises injecting liquid into the outlet end of at least one of the vertical and horizontal venturi tube absorbers to flow countercurrently to the gases.

9. A process according to claim 8, wherein the liquid is injected into the inlet end of the horizontal venturi tube to flow cocurrently with the gases.

10. A process according to claim 8, wherein a major part of the residual liquid is separated from the gas-liquid mixture entering the horizontal venturi tube by the action of internal fixtures and is conducted into the sump under the vertical venturi tube.

11. A process according to claim 8, wherein the gases are passed through a packed bed in the settling chamber before reaching the mechanical separating zone and the packed bed is supplied from above with liquid absorbent flowing countercurrently to the gases.

12. A process according to claim 8, wherein about 5–50% of the total amount of liquid are injected into the venturi tube or tubes to flow countercurrently to the gases.

13. A process according to claim 8, wherein about 10–75% of the total amount of liquid are injected into the venturi tube or tubes to flow cocurrently with the gases.

* * * * *